United States Patent
Ko et al.

(10) Patent No.: US 11,231,824 B2
(45) Date of Patent: Jan. 25, 2022

(54) TOUCH PANEL INCLUDING MESH HAVING A TRAPEZOID SHAPE

(71) Applicant: Samsung Display Co., Ltd., Yongin-si (KR)

(72) Inventors: Gwang Bum Ko, Yongin-si (KR); Hyun Jae Na, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/840,891

(22) Filed: Apr. 6, 2020

(65) Prior Publication Data
US 2020/0233512 A1    Jul. 23, 2020

Related U.S. Application Data

(63) Continuation of application No. 15/132,699, filed on Apr. 19, 2016, now Pat. No. 10,635,243.

(30) Foreign Application Priority Data

Sep. 16, 2015   (KR) .................. 10-2015-0130779

(51) Int. Cl.
*G06F 3/045*    (2006.01)
*G06F 3/044*    (2006.01)
*G06F 3/047*    (2006.01)

(52) U.S. Cl.
CPC ............ *G06F 3/0446* (2019.05); *G06F 3/047* (2013.01); *G06F 2203/04112* (2013.01)

(58) Field of Classification Search
CPC ........ G06F 3/044; G06F 3/047; G06F 3/0446; G06F 2203/04112
See application file for complete search history.

(56) References Cited

U.S. PATENT DOCUMENTS 8,179,381 B2    5/2012   Frey et al.
2010/0060602 A1    3/2010   Agari et al.
(Continued)

FOREIGN PATENT DOCUMENTS

KR    10-2011-0127236    11/2011
KR    10-2012-0033480    4/2012
(Continued)

OTHER PUBLICATIONS

Non-Final Office Action dated Jul. 10, 2017, in U.S. Appl. No. 15/132,699.
(Continued)

*Primary Examiner* — Adam J Snyder
(74) *Attorney, Agent, or Firm* — H.C. Park & Associates, PLC

(57) ABSTRACT

A touch panel including a sensing cell and a sensing line disposed on a transparent substrate. Each of the sensing cell and the sensing line includes at least one pattern line. The at least one pattern line includes unit patterns, each of the unit patterns including a first line extending in a first direction, a second line connected to the first line and extending in a second direction intersecting the first direction, a third line connected to the first line and extending in a third direction intersecting the first direction, and a fourth line connected to the third line and extending in the first direction. The first line, the second line, the third line, and an extension of the fourth line form a trapezoid. The unit patterns are repeatedly arranged and adjacent unit patterns are connected each other.

12 Claims, 9 Drawing Sheets

(56) References Cited

U.S. PATENT DOCUMENTS

| | | |
|---|---|---|
| 2011/0310037 A1 | 12/2011 | Moran et al. |
| 2012/0081331 A1 | 4/2012 | Chae et al. |
| 2014/0041924 A1 | 2/2014 | Cok |
| 2014/0041999 A1* | 2/2014 | Yim ............... G06F 3/044 200/275 |
| 2014/0048315 A1 | 2/2014 | Chae et al. |
| 2014/0049485 A1 | 2/2014 | Oh et al. |
| 2014/0060909 A1* | 3/2014 | Ullmann ............ G06F 3/044 174/258 |
| 2014/0098307 A1 | 4/2014 | Iwami |
| 2014/0225839 A1* | 8/2014 | Dunphy ............ G06F 3/0443 345/173 |
| 2014/0360856 A1 | 12/2014 | Mizumoto et al. |
| 2014/0375902 A1 | 12/2014 | Westhues et al. |
| 2015/0170610 A1* | 6/2015 | Kurasawa ......... G06F 3/0445 345/174 |
| 2015/0242013 A1 | 8/2015 | Ono et al. |
| 2016/0062499 A1 | 3/2016 | Pedder et al. |
| 2016/0313827 A1* | 10/2016 | Song ................ G06F 3/0443 |

FOREIGN PATENT DOCUMENTS

| | | |
|---|---|---|
| KR | 10-2014-0023046 | 2/2014 |
| KR | 10-1397200 | 5/2014 |

OTHER PUBLICATIONS

Final Office Action dated Dec. 7, 2017, in U.S. Appl. No. 15/132,699.
Advisory Action dated Feb. 23, 2018, in U.S. Appl. No. 15/132,699.
Non-Final Office Action dated May 24, 2018, in U.S. Appl. No. 15/132,699.
Final Office Action dated Nov. 21, 2018, in U.S. Appl. No. 15/132,699.
Advisory Action dated Jan. 25, 2019, in U.S. Appl. No. 15/132,699.
Non-Final Office Action dated Apr. 1, 2019, in U.S. Appl. No. 15/132,699.
Final Office Action dated Aug. 13, 2019, in U.S. Appl. No. 15/132,699.
Advisory Action dated Oct. 10, 2019, in U.S. Appl. No. 15/132,699.
Notice of Allowance dated Dec. 27, 2019, in U.S. Appl. No. 15/132,699.

* cited by examiner

TOUCH PANEL INCLUDING MESH HAVING A TRAPEZOID SHAPE

CROSS-REFERENCE TO RELATED APPLICATION

This application is a Continuation of U.S. patent application Ser. No. 15/132,699, filed Apr. 19, 2016, which claims priority from and the benefit of Korean Patent Application No. 10-2015-0130779, filed on Sep. 16, 2015, which are hereby incorporated by reference for all purposes as if fully set forth herein.

BACKGROUND

Field

Exemplary embodiments relate to a touch panel, and, more particularly, to a touch panel that may prevent occurrence of a moiré phenomenon.

Discussion of the Background

A touch panel is an inputting device configured to enable a user to input a command by selecting an instruction appearing on a screen of a display apparatus with the user's hand or an object. A touch panel includes sensing cells and sensing lines. In general, sensing cells may include transparent conductive material, such as indium tin oxide (ITO) film.

Recently, touch panels including metal mesh having high electrical conductivity are being developed, in addition to touch panels including the transparent conductive material. A pattern of the metal mesh may include straight lines intersecting each other. The pattern of the metal mesh may regularly intersect with a pixel pattern or electrode pattern of a display panel, or with patterns of optical films, which may cause optical interference and a moiré phenomenon. Furthermore, since intersecting points of the straight lines in the patterns of the metal mesh arrange regularly, the sensing cells and sensing lines may become recognizable to users.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a touch panel including sensing cells and sensing lines that have zig-zag shaped pattern lines, thereby preventing the moiré phenomenon, and lowering the possibility of the sensing cells and sensing lines being observed by a user.

Additional aspects will be set forth in the detailed description which follows, and, in part, will be apparent from the disclosure, or may be learned by practice of the inventive concept.

According to an exemplary embodiment of the present invention, a touch panel includes a transparent substrate, and a sensing cell and a sensing line disposed on the transparent substrate, each of the sensing cell and the sensing line including at least one pattern line, in which the at least one pattern line includes unit patterns. Each of the unit patterns includes a first line extending in a first direction, a second line having a first side connected to a first side of the first line, the second line extending in a second direction intersecting the first direction, a third line having a first side connected to a second side of the first line, the third line extending in a third direction intersecting the first direction, and a fourth line connected to a second side of the third line, the fourth line extending in the first direction. The first line, the second line, the third line, and an extension of the fourth line form a trapezoid. The unit patterns are repeatedly arranged and adjacent unit patterns are connected to each other.

According to exemplary embodiments, a touch panel may include sensing cells and sensing lines including zig-zag shaped pattern lines, which may prevent occurrence of a moiré phenomenon. Furthermore, the pattern lines are connected by connecting patterns, which may lower the possibility of the sensing cells and sensing lines being observed externally.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
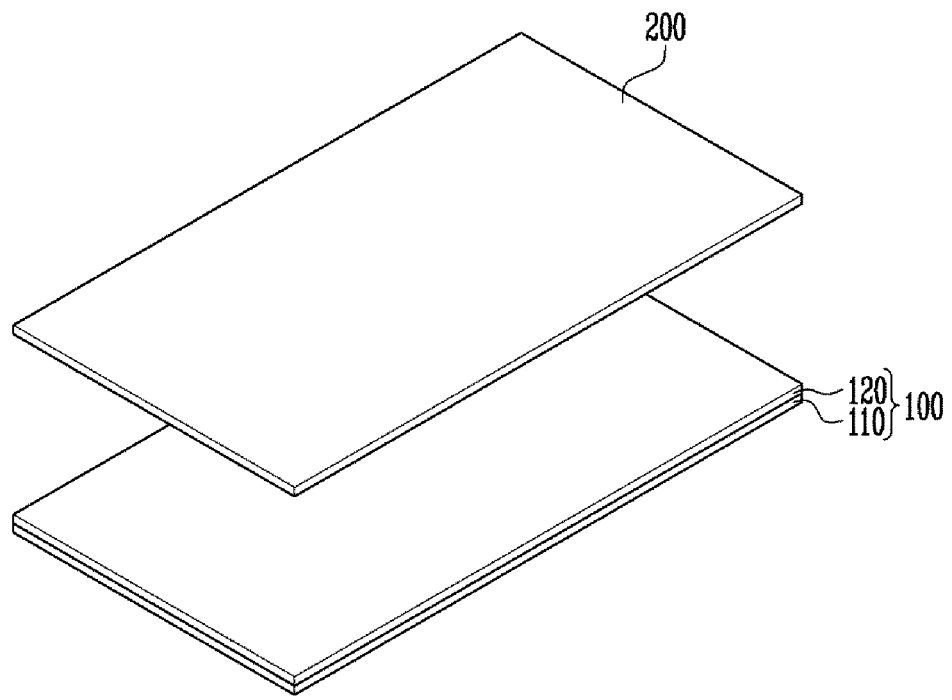
FIG. 1 is an exploded perspective view illustrating a display apparatus according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
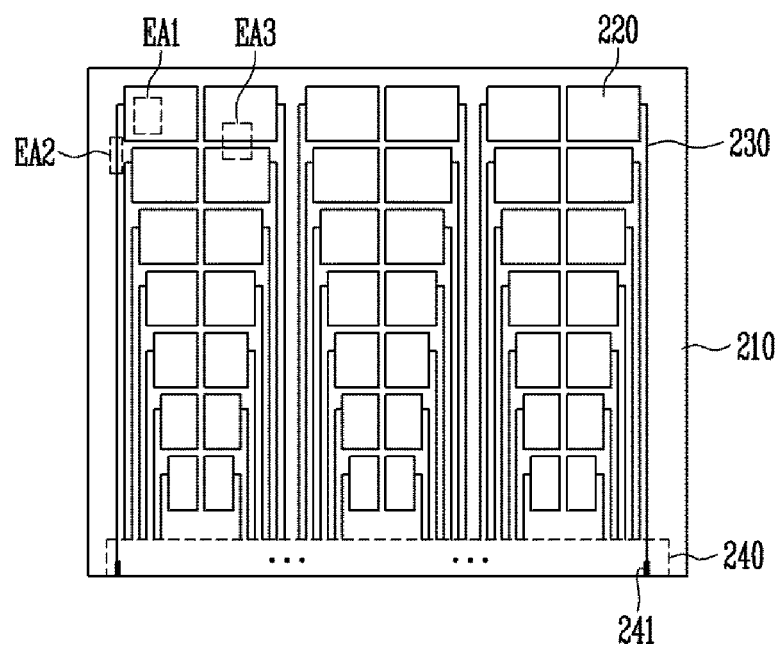
FIG. 2 is a plan view schematically illustrating the touch panel of FIG. 1.

FIG. 1 is an exploded perspective view illustrating a display apparatus according to an exemplary embodiment of the present invention. FIG. 2 is a plan view schematically illustrating the touch panel of FIG. 1.

Referring to FIG. 1 and FIG. 2, the display apparatus may include a display panel 100 and touch panel 200. The display panel 100 may display an image. The display panel 100 may include a self-radiative display panel, such as an organic light emitting display (OLED), and a non-radiative display panel, such as a liquid crystal display (LCD) panel, an electro-phoretic display (EPD) panel, and an electro-wetting display (EWD). When the display panel 100 includes a non-radiative display panel as the display panel 100, a mobile device including the display panel 100 may include a back-light unit for supplying light to the display panel 100. Hereinafter, the display panel 100 will be described with reference to an OLED panel, in order to avoid obscuring exemplary embodiments described herein.

The display panel 100 may include pixels. Each pixel may be one of a red pixel, a green pixel, a blue pixel, and a white pixel. Alternatively, each pixel may be, for example, one of a magenta pixel, a cyan pixel, and a yellow pixel, etc.

The display panel 100 may include display elements disposed in the pixels. The display elements may be an OLED element. The display panel 100 may include a first substrate 110, on which the OLED element is disposed, and a second substrate 120 facing the first substrate 110.

The first substrate 110 may include a thin-film transistor substrate (not illustrated) having at least one thin-film transistor disposed on an insulating substrate, and the OLED element connected to the thin-film transistor. The first substrate 110 may include a driver (not illustrated) disposed on one side of the thin-film transistor substrate and configured to drive the OLED element. The driver may be a chip-on-glass (COG) type driving element.

The OLED element is disposed on the thin-film transistor substrate. The OLED element may include a first electrode connected to the thin-film transistor, an organic layer disposed on the first electrode, and a second electrode disposed on the organic layer. One of the first electrode and second electrode may be an anode electrode, and the other one of the first electrode and second electrode may be a cathode electrode. At least one of the first electrode and second electrode may be transparent.

The first electrode may be a conductive film that includes transparent conductive oxides, such as indium tin oxide (ITO), indium zinc oxide (IZO), aluminum zinc oxide (AZO), gallium zinc oxide (GZO), zinc tin oxide (ZTO), gallium tin oxide (GTO), and fluorine doped tin oxide (FTO). The second electrode may reflect light, and may include at least one of molybdenum (Mo), molybdenum tungsten (MoW), chromium (Cr), aluminum (Al), aluminum neodymium (AlNd), and alloy thereof, which may have lower work functions than the first electrode.

The organic layer may include at least one emitting layer (EML), and may have a multi-layered thin-film structure. For example, the organic layer may include a hole injection layer (HIL) for injecting holes, a hole transport layer (HTL) having high hole transportability, which may block the movement of electrons that failed to couple with holes in the emitting layer, so as to increase the re-coupling possibility between the holes and electrons, the emitting layer that emits light from recombination of the injected electrons and the holes, a hole blocking layer (HBL) for suppressing the movement of the holes that failed to combine with electrons in the emitting layer, and an electron injection layer (EIL) for injecting electrons. The color of light generated in the emitting layer may be one of red, green, blue, and white. Alternatively, the color may include, for example, one of magenta, cyan, and yellow, and etc.

The second substrate 120 may isolate the OLED element from an external environment, and may be bonded to the first substrate 110 by using an encapsulant, such as a sealant. The second substrate 120 may be a transparent insulating substrate. When the OLED element is encapsulated with a transparent insulating film and the like, the second substrate 120 may be omitted.

The touch panel 200 may be disposed on one surface of the display panel 100, for example, on the surface configured to output images of the display panel 100 and receive the user's touch inputs. The touch panel 200 may include a base substrate 210 including a transparent material, sensing cells 220 disposed on the base substrate 210, sensing lines 230 connected to the sensing cells 220, and a pad unit 240 electrically connected to an external driving circuit (not illustrated) via the sensing lines 230.

The base substrate 210 may include a transparent insulating material. For example, the base substrate 210 may include flexible materials, such as polyethersulfone (PES), polyacrylate, polyetherimide (PEI), polyethylene naphthalate (PEN), polyethylene terephthalate (PET), polyphenylene sulfide (PPS), polyarylate (PAR), polyimide (PI), polycarbonate (PC), cellulose triacetate (TAC), and cellulose acetate propionate (CAP). Furthermore, the base substrate 210 may include any one of the solid materials of glass and tempered glass.

The sensing cells 220 may sense a change in capacitance from a touch input made by the user's body part or an object, such as a stylus pen and the like. The sensing cells 220 may include a conductive material for sensing a change of capacitance. For example, the sensing cells 220 include conductive lines, which may include at least one of aluminum (Al), copper (Cu), chromium (Cr), nickel (Ni), gold (Au), platinum (Pt), and alloy thereof.

The sensing lines 230 may transmit a change of capacitance sensed by the sensing cells 220 to the external circuit through the pad unit 240. The sensing lines 230 may include a conductive line. The pad unit 240 includes pads 241. Each of the pads 241 may be connected to each sensing line 230.

Figure 3:
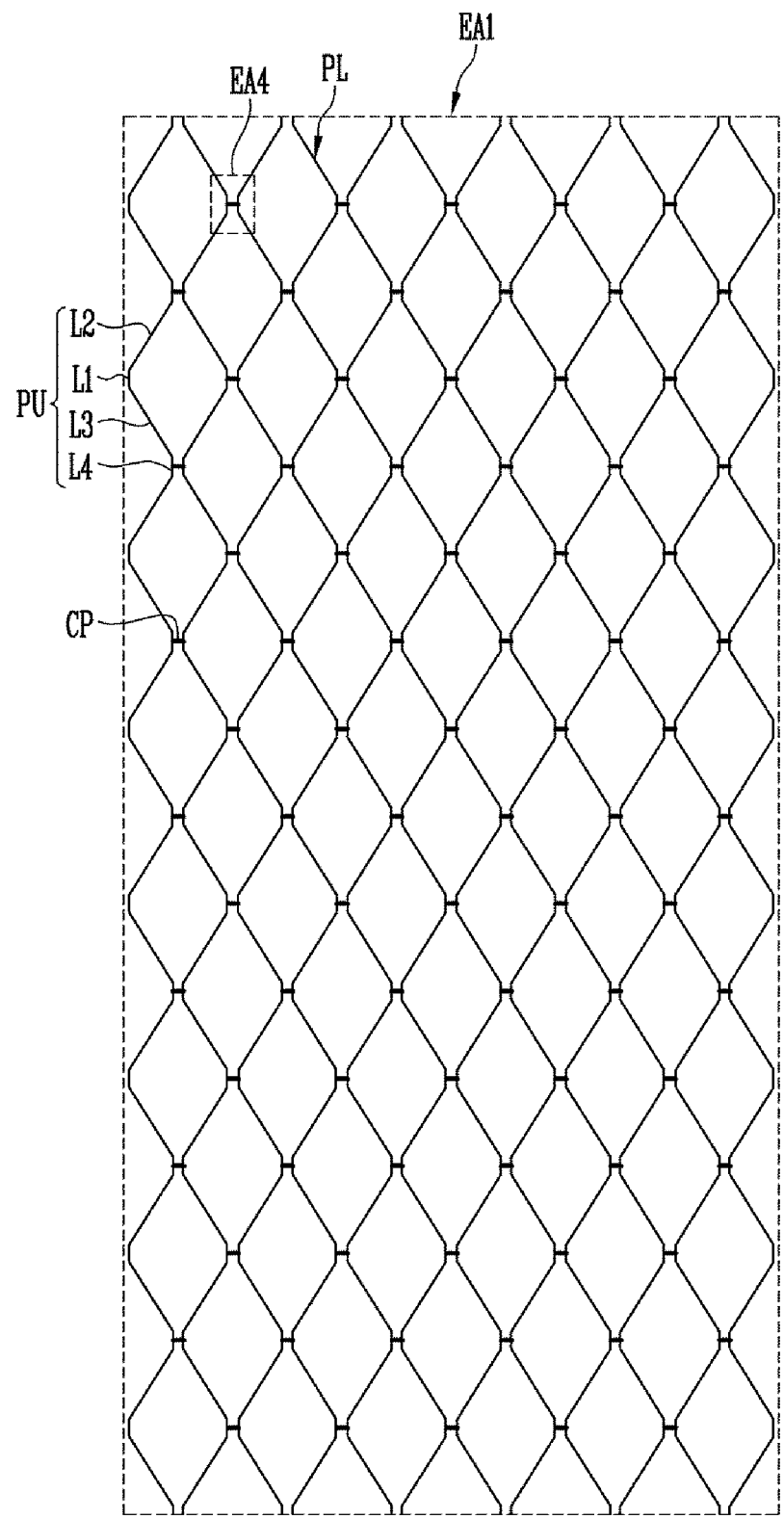
FIG. 3 is an enlarged view of EA1 area of FIG. 2.
Figure 4:
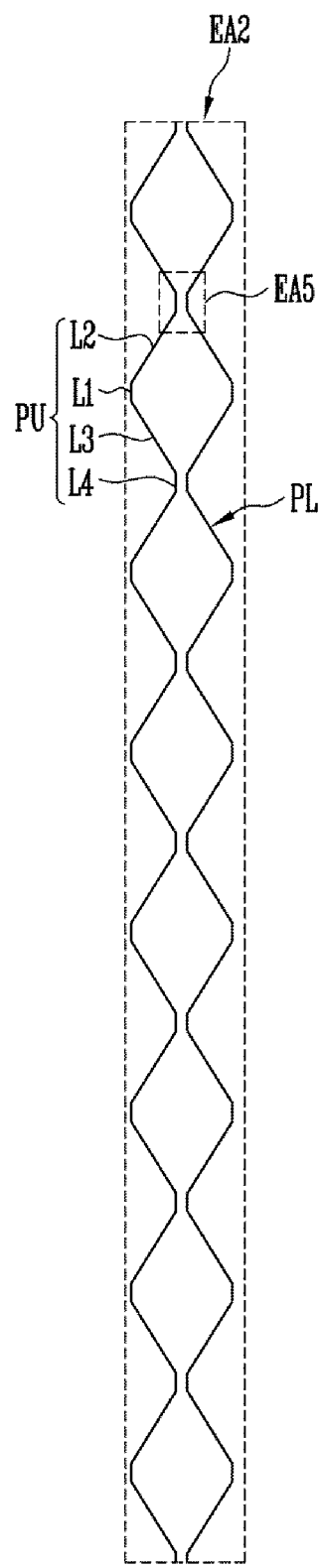
FIG. 4 is an enlarged view of EA2 area of FIG. 2.

FIG. 3 is an enlarged view of EA1 area of FIG. 2. FIG. 4 is an enlarged view of EA2 area of FIG. 2. FIG. 6, FIG. 7, FIG. 8, FIG. 9, and FIG. 10 are enlarged views of EA4 area of FIG. 3, according to exemplary embodiments of the present invention.

Referring to FIGS. 3 to 13, a sensing cell 220 and sensing line 230 may include at least one pattern line PL that is conductive. The pattern lines PL may have a zig-zag shape. The pattern lines PL may include unit patterns PU. The unit patterns PU are repeatedly arranged and may be connected to the neighboring unit patterns PU.

The unit patterns PU may each include a first line L1 extending in a first direction, a second line L2 having one side thereof connected to one side of the first line L1 and extending in a second direction intersecting the first direction, a third line L3 having one side thereof connected to the other side of the first line L1 and extending in a third direction intersecting the first direction, and a fourth line L4 having one side thereof connected to the other side of the third line L3 and extending in the first direction.

An extension of the fourth line L4, the first line L1, the second line L2, and the third line L3 may form a trapezoid. A fourth line L4 of a unit pattern PU may be connected to a second line L2 of a neighboring unit pattern PU.

The sensing cells 220 may include the pattern lines PL spaced apart from one another. A first line L1 of a pattern line PL may face a fourth line L4 of a neighboring pattern line PL. The distance between the first line L1 and the fourth line L4 of a neighboring pattern line PL, which face each other, may be less than or equal to 10 μm. When the distance between the first line L1 and the fourth line L4 of a neighboring pattern line PL is greater than 10 μm, the number of pattern lines PL in the sensing cell 220 may decrease. Sensing sensitivity of the sensing cell 220 may decrease when the number of pattern lines PL in the sensing cell 220 decreases.

The pattern lines PL may be electrically connected to one another via connecting patterns CP. For example, the connecting patterns CP may electrically connect the first line L1 and the fourth line L4 of a neighboring pattern line PL that are facing each other. The connecting pattern CP may have various shapes, which will be described in more detail below with reference to FIGS. 6 to 10.

Figure 6:
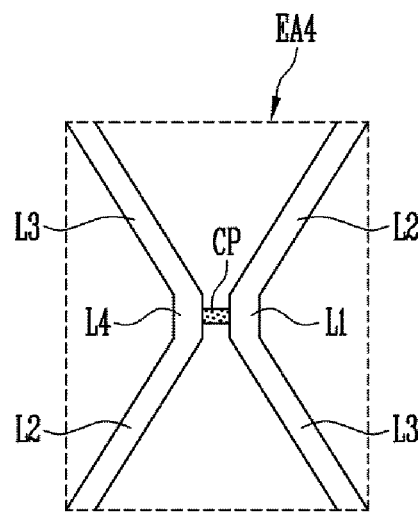
FIG. 6, FIG. 7, FIG. 8, FIG. 9, and FIG. 10 are enlarged views of EA4 area of FIG. 3.

Referring to FIG. 6, the connecting pattern CP may have a bar shape extending in a direction perpendicular to an extending direction of the first line L1 or the fourth line L4. The connecting pattern CP may connect the centers of the first line L1 and the fourth line L4 facing each other.

Figure 7:
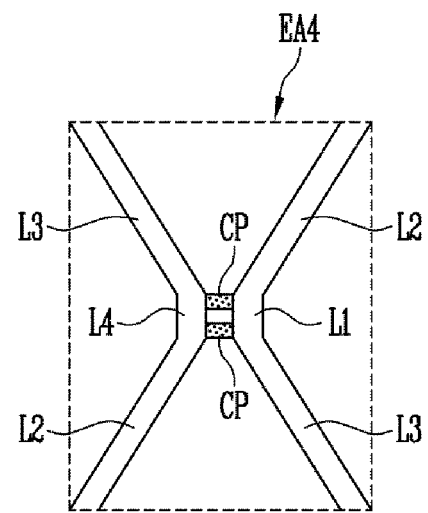

Referring to FIG. 7, the connecting pattern CP may have two parallel bars each connecting the first line L1 and the fourth line L4 at both ends thereof.

Figure 8:
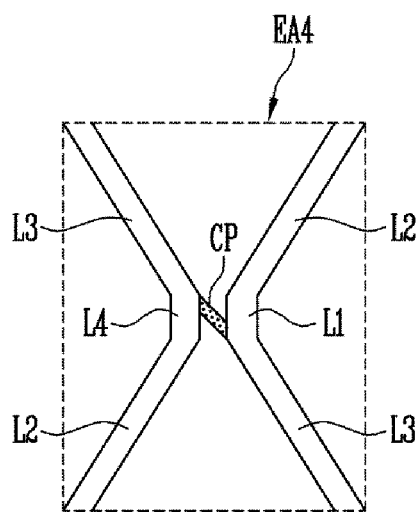

Referring to FIG. 8, the connecting pattern CP may have a bar shape extending in an inclined direction with respect to the extending direction of the first line L1, and may be disposed between the first line L1 and the fourth line L4 facing each other.

Figure 9:
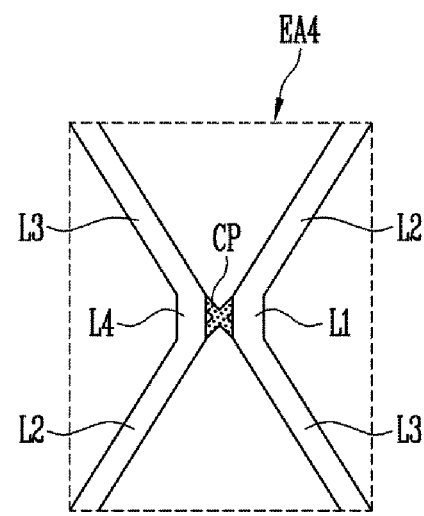

Referring to FIG. 9, the connecting pattern CP may have two inclined lines that connect the first line L1 and the fourth line L4 facing each other, and the two inclined lines may intersect each other.

Figure 10:
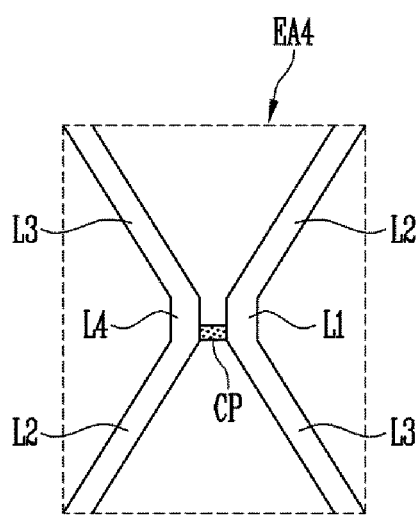

Referring to FIG. 10, the connecting pattern CP may have a bar shape extending in a direction perpendicular to the extending direction of the first line L1 or fourth line L4. The bar may connect an upper end of the first line L1 with an upper end of the fourth line L4 or a lower end of the first line L1 with a lower end of the fourth line L4.

Figure 5:
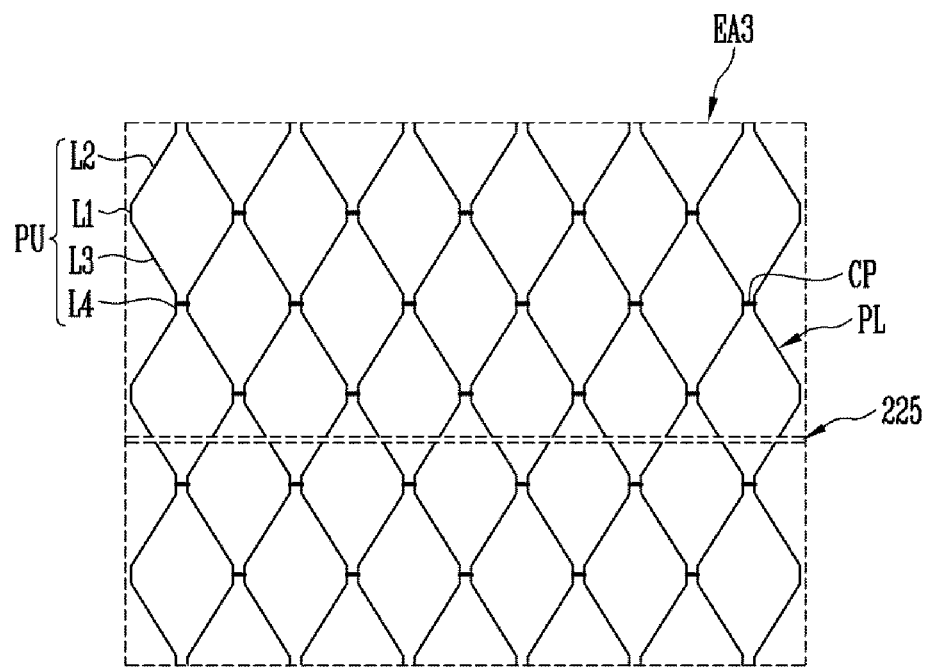
FIG. 5 is an enlarged view of EA3 area of FIG. 2.

FIG. 5 is an enlarged view of EA3 area of FIG. 2.

Referring to FIG. 5, the pattern lines PL of neighboring sensing cells 220 may be spaced apart from each other by a cutting section 225. The cutting section 225 extends along a direction intersecting an extending direction of the first line L1 and second line L2, respectively. More particularly, the cutting section 225 extends in a direction perpendicular to the extending direction of the first line L1. The cutting section 225 divides the second line L2 or third line L3 of the unit patterns PU into two sections, and the two divided sections may be spaced apart from each other by the cutting section 225.

Figure 11:
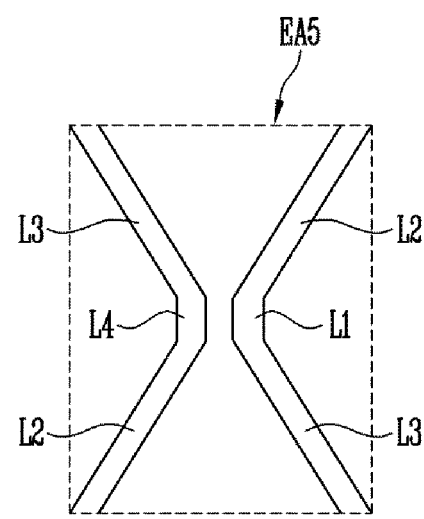
FIG. 11, FIG. 12, and FIG. 13 are enlarged views of EA5 area of FIG. 4.
Figure 12:
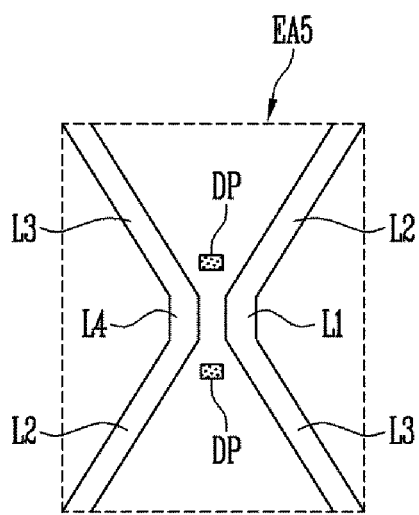
Figure 13:
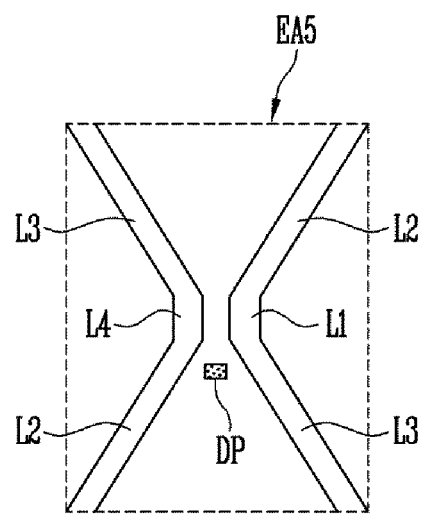

FIG. 11, FIG. 12, and FIG. 13 are enlarged views of EA5 area of FIG. 4.

The sensing line 230 may include at least one pattern line PL. For example, when the sensing line 230 includes one pattern line PL, that pattern line PL itself may be the sensing line 230.

Referring to FIGS. 11 to 13, a sensing line 230 may include multiple pattern lines PL spaced apart from each other. In the sensing line 230, the distance between the first line L1 and the fourth line L4 facing each other may be less than or equal to 10 μm. When the distance between the first line L1 and the fourth line L4 of a neighboring pattern line PL is greater than 10 μm, the number of pattern lines PL in the sensing line 220 may decrease. Resistance of the sensing line 230 may increase when the number of pattern lines PL in the sensing line 230 decreases.

A sensing line 230 may include dummy patterns DP. For example, as illustrated in FIG. 12, the dummy patterns DP may be formed as a pair of bars, of which a first bar is spaced apart from upper ends of the first line L1 and the fourth line L4, and a second bar is spaced apart from lower ends of the first line L1 and the fourth line L4. In this case, the connecting patterns CP of the sensing cells 220 may have the shape illustrated with reference to FIG. 6. More particularly, the connecting patterns CP may have a bar shape extending in a direction perpendicular to an extending direction of the first line L1 or fourth line L4, in which the bar connects the centers of the first line L1 and the fourth line L4.

Referring to FIG. 13, the dummy pattern DP may have a bar shape extending in a direction perpendicular to the extending direction first line L1 or fourth line L4. The dummy pattern DP may be spaced apart from upper ends of the first line L1 and the fourth line L4 or lower ends of the first line L1 and the fourth line L4.

In this case, the connecting patterns CP of the sensing cells 220 may have the shape illustrated with reference to FIG. 10. More particularly, the connecting pattern CP may have a bar shape extending in a direction perpendicular to an extending direction of the first line L1 or fourth line L4. The bar connects an upper end of the first line L1 with an upper end of the fourth line L4 or a lower end of the first line L1 with a lower end of the fourth line L4. For example, the connecting pattern CP may have a bar shape extending in the perpendicular direction to the first line L1 or fourth line L4, the bar connecting lower ends of the first line L1 and the fourth line L4 facing each other.

FIG. 3, FIG. 14, FIG. 15, and FIG. 16 are views illustrating an arrangement of connecting patterns, which are enlarged views of the EA1 area of FIG. 2, according to exemplary embodiments of the present invention.

Referring to FIG. 3 and FIGS. 14 to 16, the connecting patterns CP may electrically connect the pattern lines PL neighboring each other. For example, the connecting patterns CP may electrically connect the first line L1 and the fourth line L4 facing each other.

The connecting patterns CP may be arranged in various forms. For example, as illustrated in FIG. 3, in the sensing cells 220, a connecting pattern CP may be arranged on each area where a first line L1 and a fourth line L4 of a neighboring pattern line PL face each other, thereby electrically connecting the first lines L1 and the fourth lines L4 facing each other.

Figure 14:
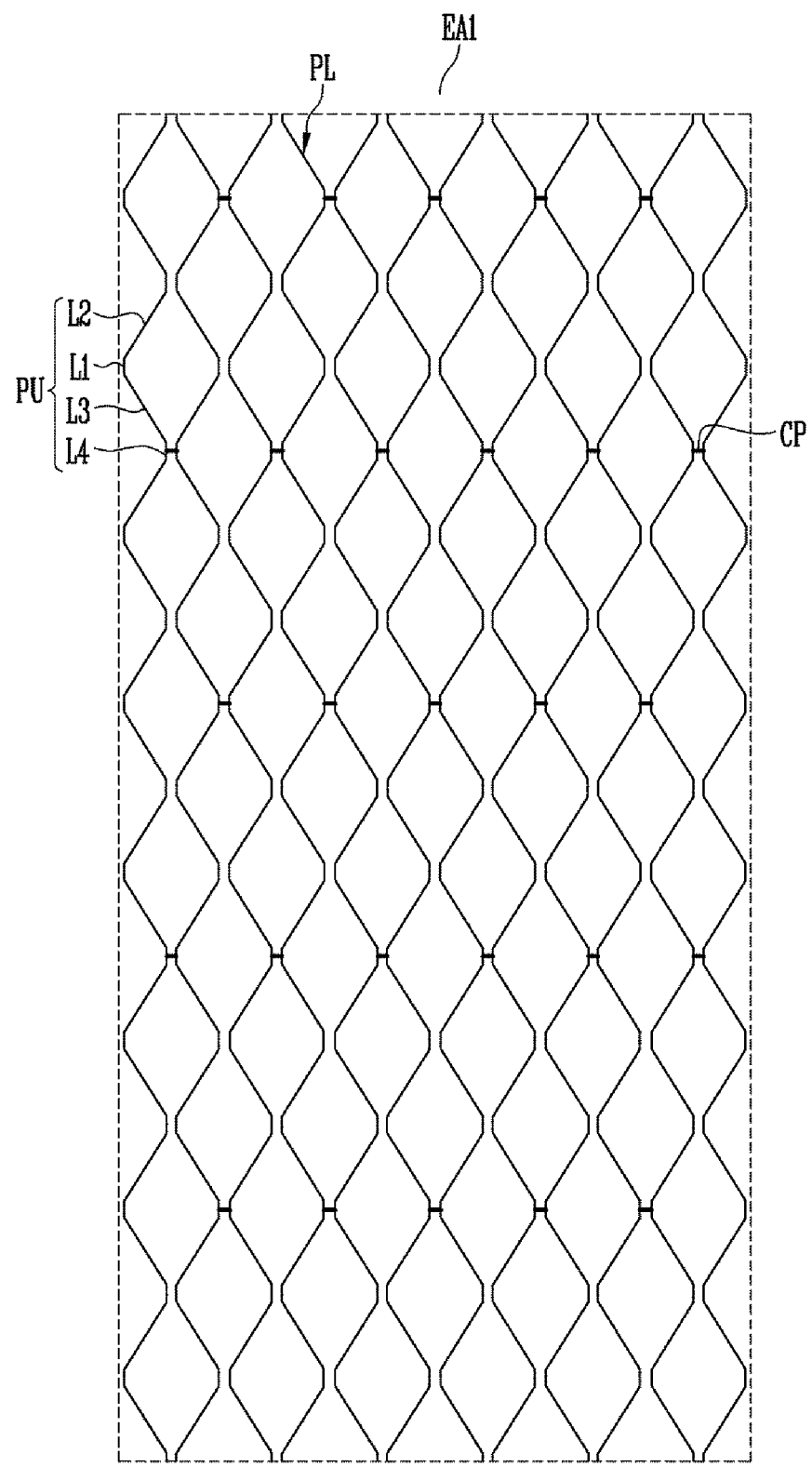
FIG. 14, FIG. 15, and FIG. 16 are views illustrating arrangements of connecting patterns, accord to exemplary embodiments of the present invention.
Figure 15:
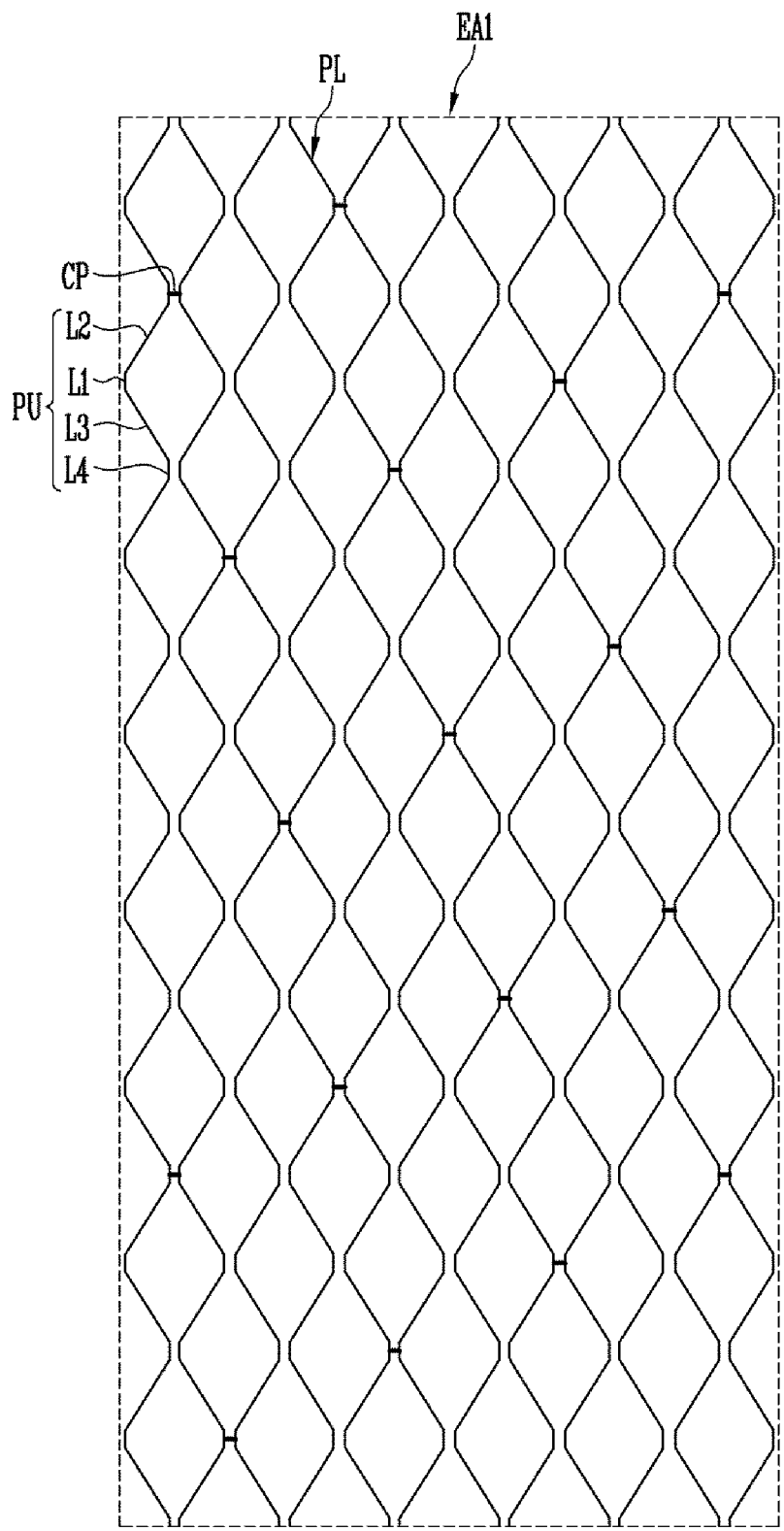
Figure 16:
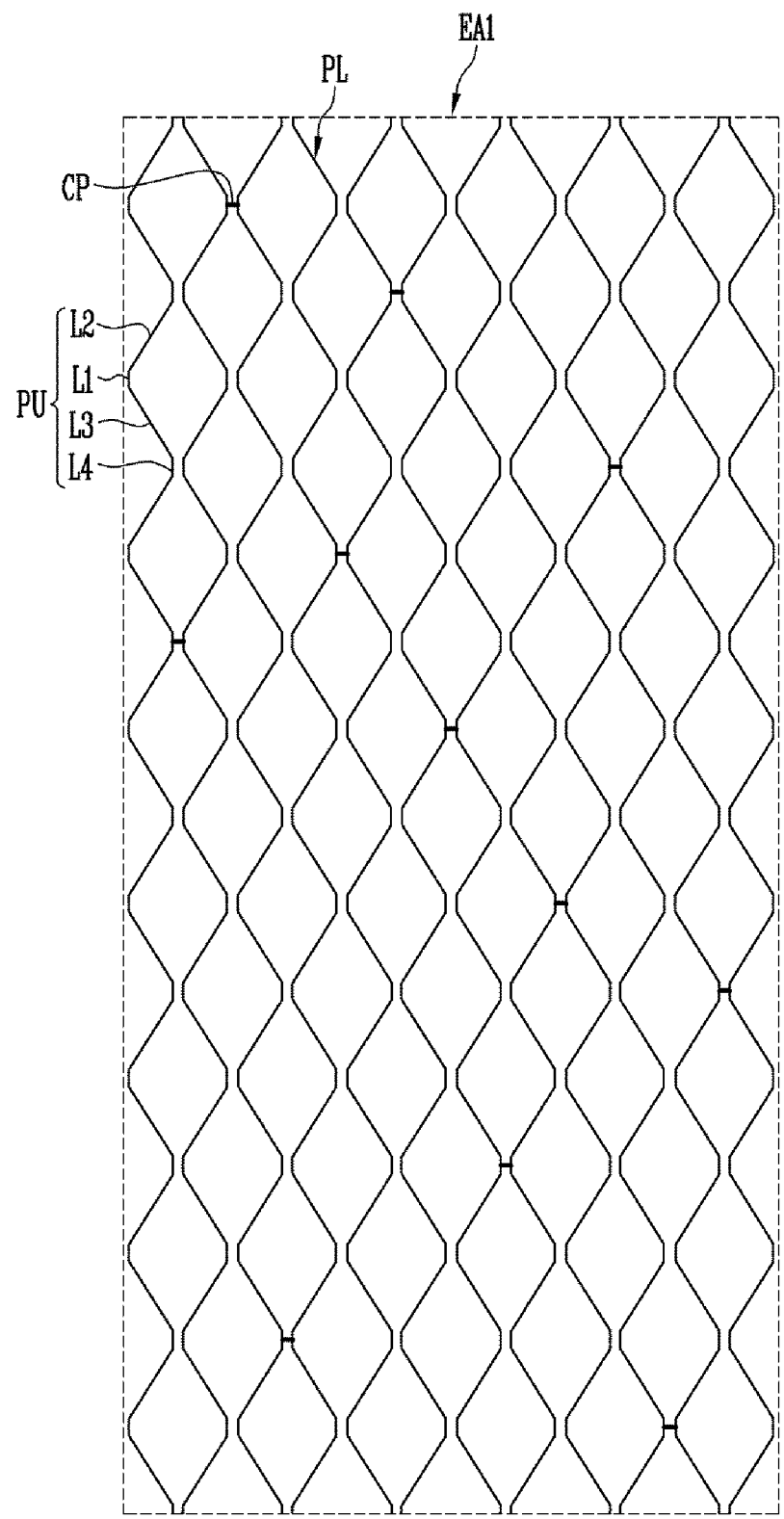

Alternatively, the connecting patterns CP may not be arranged on each area where a first line L1 and the fourth line L4 of a neighboring pattern line PL face each other. For example, as illustrated in FIG. 14 and FIG. 15, connecting patterns CP may be formed on every plural areas. For instance, referring to FIG. 14, a connecting pattern CP may be formed on every third area, a first area and a second area being successive to the third area in a vertical direction and not being formed with a connection pattern CP therein where the first line L1 and the fourth line L4 of the neighboring pattern line PL face each other. Referring to FIG. 16, connecting patterns CP may be arranged randomly on any area where a first line L1 and a fourth line of a neighboring pattern PL face each other. When the sensing lines 230 include multiple pattern lines PL and dummy patterns DP, the pattern lines PL and the dummy patterns DP may have the same arrangement.

According to exemplary embodiments, a touch panel 200 may include sensing cells 220 and sensing lines 230 having zig-zag shaped pattern lines PL, which may reduce an occurrence of the moiré phenomenon, as compared to a metal mesh pattern having straight lines intersecting one another. Pattern lines PL of neighboring sensing cells 220 may be distanced by the cutting section 225, which separates a second line L2 or a third line L3 of a unit patterns PU into two sections. As such, a touch panel 200 according to exemplary embodiments may reduce the possibility that the sensing cells 220 and sensing lines 230 will be recognized by the user.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A touch panel comprising:
a sensing cell configured to sense a change in capacitance; and
a sensing line configured to transmit the change in the capacitance sensed by the sensing cell to an external circuit,
wherein:
the sensing cell includes a plurality of pattern lines electrically connected to each other through a plurality of connecting patterns arranged along a length of each of the plurality of pattern lines;
the sensing line includes a plurality of pattern lines electrically separated from each other;
two adjacent pattern lines in the sensing cell includes, at each of a plurality of locations along the length of each of the plurality of pattern lines:
a first line including a portion having a minimum distance between the two adjacent pattern lines; and
a second line extending such that a distance between the two adjacent pattern lines is farther from the first line;
each of two adjacent pattern lines in the sensing line includes:
a third line including a portion having a minimum distance between the two adjacent pattern lines; and
a fourth line extending such that a distance between the two adjacent pattern lines is farther from the third line;
one end of each of the plurality of connecting patterns is connected to the first line of one of the two adjacent pattern lines, and the other end of each of the plurality of connecting patterns is connected to the first line of the other one of the two adjacent pattern lines; and
the plurality of connecting patterns are arranged at some, but not all, of the locations along the length of each of the plurality of pattern lines in which the first lines of two adjacent pattern lines are arranged at the minimum distance between the two adjacent pattern lines.

2. The touch panel according to claim 1, wherein:
the sensing line further includes a dummy pattern positioned between the two adjacent pattern lines; and
the dummy pattern is electrically separated from the two adjacent pattern lines in the sensing line.

3. The touch panel according to claim 1, wherein a minimum distance between two first lines is 10 μm or less.

4. The touch panel according to claim 1, wherein two first lines contact each of the plurality of connecting patterns.

5. The touch panel according to claim 4, wherein locations in which the plurality of connecting patterns are arranged are spaced apart periodically.

6. The touch panel according to claim 4, wherein each of the plurality of connecting patterns extends in a direction different from a direction in which the two first lines extend.

7. The touch panel according to claim 1, wherein each of the two adjacent pattern lines in the sensing cell further includes a fifth line extending from the first line in an opposite direction to the second line.

8. The touch panel according to claim 7, wherein an arrangement of the first line, the second line, and the fifth line in each of the two adjacent pattern lines of the sensing cell is repeated a plurality of times.

9. The touch panel according to claim 8, wherein first lines that are repeated a plurality of times in the two adjacent pattern lines in the sensing cell include a portion in contact with each of the plurality of connecting patterns, and a remaining portion not in contact with each of the plurality of connecting patterns.

10. The touch panel according to claim 1, wherein each of the plurality of pattern lines in the sensing cell is divided into two regions by a cutting section.

11. The touch panel according to claim 1, wherein the plurality of pattern lines in the sensing cell and the sensing line have a zig-zag shape.

12. The touch panel according to claim 1, wherein each of the plurality of connecting patterns has a bar shape.

* * * * *